United States Patent

Hannerz

[11] 3,769,157
[45] Oct. 30, 1973

[54] EMERGENCY COOLING OF A GAS-COOLED NUCLEAR REACTOR

[75] Inventor: Kare Hannerz, Vasteras, Sweden
[73] Assignee: A B Asea - Atom, Vasteras, Sweden
[22] Filed: Aug. 23, 1971
[21] Appl. No.: 173,976

[30] Foreign Application Priority Data
Aug. 25, 1970 Sweden.............................. 11504/70

[52] U.S. Cl..................................... 176/38, 176/60
[51] Int. Cl.............................................. G21c 9/00
[58] Field of Search........................... 176/38, 60, 65

[56] References Cited
UNITED STATES PATENTS

| | | | |
|---|---|---|---|
| 3,153,618 | 10/1964 | Acklin | 176/60 X |
| 3,607,636 | 9/1971 | Nageler | 176/60 |
| 3,253,994 | 5/1966 | Kagi | 176/60 |
| 3,444,038 | 5/1969 | Schabert | 176/60 |
| 3,410,091 | 11/1968 | Frutschi | 176/60 X |
| 3,377,800 | 4/1968 | Spillman | 176/59 |
| 3,467,577 | 9/1969 | Winkler | 176/55 |
| 3,431,168 | 3/1969 | Kjemtrup | 176/38 X |

Primary Examiner—Harvey E. Behrend
Attorney—Jennings Bailey, Jr.

[57] ABSTRACT

For emergency cooling of a nuclear reactor plant, there is provided a primary flow circuit for cooling gas through the reactor core, and then through the primary sides of a reheater and a main steam generator, to a main circulator pump which returns the gas to the core. Another flow circuit is provided which conducts condensed water from a turbine condenser to the secondary side of a main steam generator, and conducts the steam produced therein through a high pressure part of a main turbine and then to the secondary side of the reheater and to the low pressure part of the main turbine and to the condenser. Condensed water from the condenser is also pumped into an auxiliary generator parallel with the main steam generator where it is vaporized and the steam produced is conducted to the secondary part of the reheater 9, and then to a turbine which drives the main circulator. A shunt conduit in connection with a shunt valve is arranged to connect the outlet of the secondary side of the main steam generator to the inlet of the drive turbine of the main circulator.

1 Claim, 1 Drawing Figure

PATENTED OCT 30 1973 3,769,157
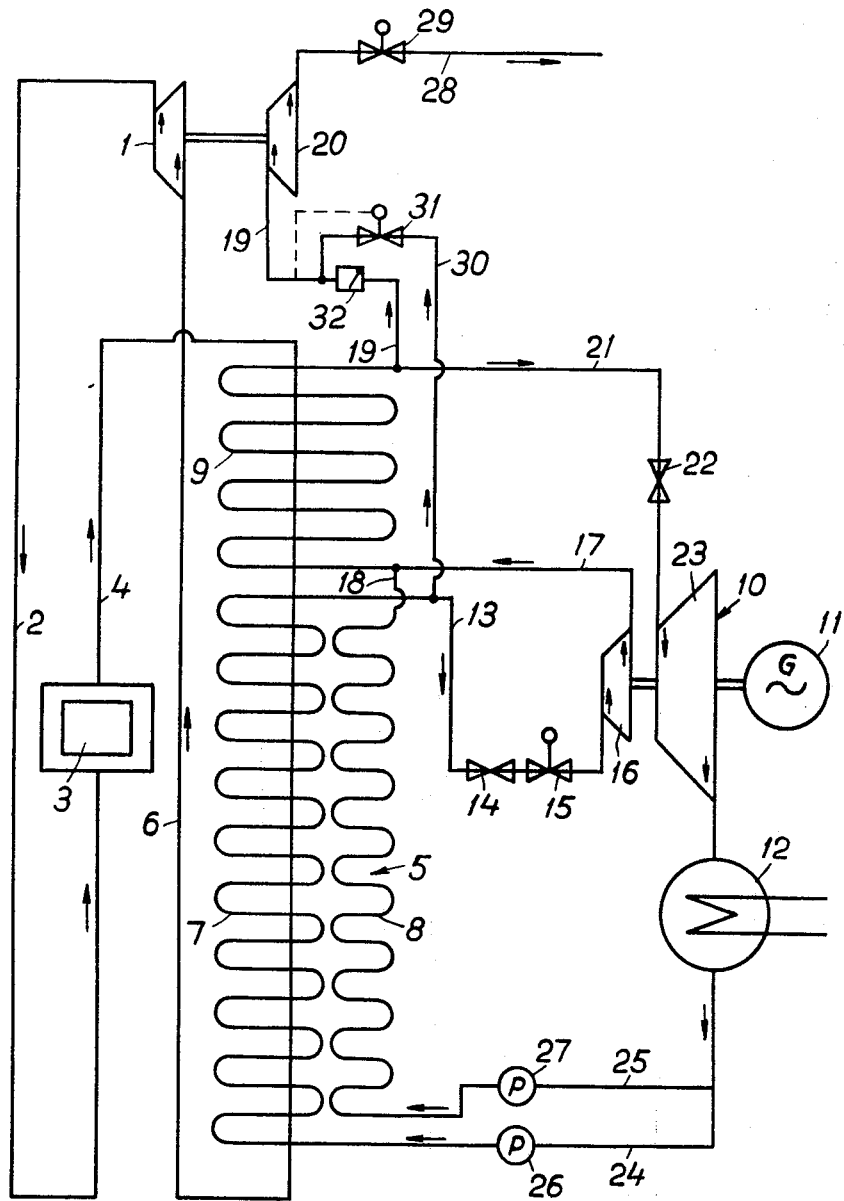
INVENTOR.
KÅRE HANNERZ
BY Jennings Bailey Jr

EMERGENCY COOLING OF A GAS-COOLED NUCLEAR REACTOR

BACKGROUND OF THE INVENTION

1. Field of the Invention

The present invention relates to an emergency cooling system for a nuclear reactor plant.

2. The Prior Art

In gas-cooled nuclear reactors, particularly fast reactors, cooling of the fuel presents a considerable problem — if the gas pressure disappears, cooling of the fuel becomes difficult. For economical reasons it has been suggested that a turbocirculator driven by a steam turbine supplied with steam directly from the steam generators of the reactor should be used for reactors having an indirect steam cycle. This source of driving steam should be maintained during emergency cooling both for reasons of economy and also for safety of operation. However, it is also desirable to lower the temperature in the steam generator as far as possible during emergency cooling in order to achieve the best possible cooling effect for the circulating gas. This requirement is in opposition to the need to produce large quantities of driving steam of good quality.

SUMMARY OF THE INVENTION

This problem is solved by the emergency cooling system according to the invention in which there is provided a primary flow circuit for cooling gas through the reactor core, and then through the primary sides of a reheater and a main steam generator, to a main circulator pump which returns the gas to the core. Another flow circuit is provided which conducts condensed water from a turbine condenser to the secondary side of a main steam generator, and conducts the steam produced therein through a high pressure part of a main turbine and then to the secondary side of the reheater and to the low pressure part of the main turbine and to the condenser. Condensed water from the condenser is also pumped into an auxiliary generator parallel with the main steam generator where it is vaporized and the steam produced is conducted to the secondary part of the reheater 9, and then to a turbine which drives the main circulator. A shunt conduit in connection with a shunt valve is arranged to connect the outlet of the secondary side of the main steam generator to the inlet of the drive turbine of the main circulator. In this way the least possible number of components specifically intended for the emergency situation, such as emergency circulators, valves to be reversed, and the like is used so that the cost for the components is low while the operational safety is high.

BRIEF DESCRIPTION OF THE DRAWINGS

In the following the invention will be described in more detail with reference to the accompanying drawing which shows schematically the main lines in a flow diagram for a gas-cooled nuclear reactor having an indirect steam cycle.

DESCRIPTION OF THE PREFERRED EMBODIMENT

The cooling gas, for example helium, is circulated through a primary circuit by means of a plurality of main circulators 1, one of which is shown. From the main circulator 1, the gas passes through a conduit 2 to the reactor core 3 where it is heated while cooling the fuel. The gas then flows further through a conduit 4 to a heat-exchanger battery 5, passing the primary side of this while being cooled and at the same time vaporizing water being vaporized. The cooled gas is then conducted back to the main circulator 1 through a conduit 6 to start a fresh round through the primary circuit.

The heat-exchanger system 5 consists of a main steam generator 7, an auxiliary steam generator 8 and a reheater 9. The steam generators are connected in parallel and, with respect to the direction of flow of the steam in the system, located upstream from the reheater 9. The heat-exchanger system 5 is part of a secondary circuit which also includes a main turbine 10 to drive a generator 11, a turbine condenser 12 and pumps, conduits and valves.

The steam produced in the main steam generator 7 is led through a conduit 13 with a high-speed shut off valve 14 and a governer valve 15 for the turbine to the high pressure part 16 of the main turbine 10, from which it flows through a conduit 17 to the inlet side of the secondary side of the reheater 9. The steam produced in the auxiliary steam generator 8 is led through a conduit 18 directly to the inlet of the secondary side of the reheater 9. After passage through the reheater the steam is divided up so that a portion flows through a conduit 19 to a drive turbine 20 for the main circulator 1, whereas most of it flows through a conduit 21 with a high-speed shut off valve 22 to the low pressure part 23 of the main turbine 10 and then on to the condenser 12 where it is condensed. Condensed water produced is returned to the main steam generator 7 and the auxiliary steam generator 8 through conduits 24 and 25, respectively, by the feedwater pumps 26 and 27, respectively. The steam leaving the drive turbine 20 of the main circulator is led through a conduit having a starting valve 29 for the turbine, to drive turbines, not shown, for the feedwater pumps 26 and 27 and then to feedwater pre-heaters, not shown, in which it condenses. The governor valve 29 for the drive turbine is controlled by the outlet temperature and outlet pressure of the reactor. A shunt-conduit 30 having a shunt valve 31 is arranged to carry the high pressure steam from the main steam generator 7 to the supply conduit 19 of the driving turbine 20. A non-return valve 32 located in the supply conduit 19 prevents the driving steam from passing through the conduit 21 to the main turbine 10.

The equipment operates in the following manner: The main steam generator 7 which gives, for example, about 80 percent of the steam flow, operates at high pressure, for example about 160 bar and sends superheated steam to the high pressure part 16 of the main turbine. The auxiliary steam generator 8 operates at the pressure of the reheater 9, for example about 30 bar, and the exit steam, which is substantially saturated, is mixed with the steam coming from the high pressure part of the main turbine before entry into the reheater 9. At full power the governor valve 15 for the turbine is almost completely open and the shunt valve 31 is almost completely closed. The latter is controlled by the pressure at the inlet of the drive turbine 20 and tends to keep this constant.

If there is a sudden partial load drop on the grid to which the generator 11 is connected, the governor valve 15 of the turbine closes partially in the normal manner so that the pressure in the reheater 9 decreases. Steam is then supplied to the drive turbine 20 directly from the main steam generator 7 with the help of the shunt valve 31, thus making it possible at least initially to keep the speed of the main circulator 1 unaltered. When the reactor power has been adapted, for example with the help of control rods, to the decreased consumption of the grid, the governor valve 29, which is controlled by the outlet temperature and pressure of the reactor, starts to close. If desired, it is possible later on to open the valve 29 again and instead throttle the steam flow through the shunt valve 31.

If scram must be initiated, for example as a result of a leak in the primary circuit, the shunt valve 31 is closed as well as the high speed valves 14 and 22. The feedwater pumps 26 and 27 are driven at maximum speed by outlet steam from the drive turbine 20 and the main steam generator 7 is rapidly filled with water, thus improving the cooling of the cooling gas of the reactor. Since the temperature in the auxiliary generator 8 also drops, the auxiliary steam generator will to a great extent act as an economizer. However, this is compensated for by the fact that the reheater 9, which is subjected to the highest cooling gas temperature, is now entirely available for the generation of driving steam. The power supply of the main circulators is thus ensured in the best way. While the shunting of the steam described gives a slightly poorer partial load efficiency, this is of little importance since the load-dependent costs of a gas-cooled, fast reactor are extremely low.

With the arrangement described here the high speed valves 14 and 22 of the main turbine are the only members functioning in an emergency which are not in normal operation, something which gives maximum operational safety for the emergency cooling.

Another advantage is that when the reactor is started the driving steam circuit can be brought into operation before the main generator, thus decreasing the need for electric motor power for starting purposes.

I claim:

1. In a nuclear reactor plant with a gas-cooled nuclear reactor having a core and having a main steam generator, having a primary side and a secondary side, an auxiliary steam generator having a primary side and a secondary side, a reheater having a primary part and a secondary part, a main turbine having high pressure and low pressure parts and a steam condenser, a primary circuit including means to conduct cooling gas from the core through the primary part of the reheater, through the primary sides of said main steam generator and said auxiliary steam generator and back to the core, a main circulator in said conducting means for forcing gas therethrough, a circulator turbine connected to said main circulator, means to conduct water from said condenser through the secondary side of said main steam generator to the high pressure side of said turbine, from the high pressure part of said main turbine to the secondary part of said reheater and from the secondary part of the reheater to the low pressure part of the main turbine and to the condenser, means to conduct fluid from said condenser through the secondary side of said auxiliary generator to the inlet of the secondary part of the reheater, means to conduct steam from the outlet of the secondary part of the reheater to the inlet of the circulator turbine, and normally substantially closed by-pass means for conducting steam from the outlet of the secondary part of the main steam generator to the circulator turbine.

* * * * *